United States Patent [19]

Hendricks et al.

[11] Patent Number: 4,758,768
[45] Date of Patent: Jul. 19, 1988

[54] 12-STEP COMMUTATION DEVICE FOR AN ELECTRIC MOTOR

[75] Inventors: Howard F. Hendricks, Harleysville; Richard C. Green, Hatboro, both of Pa.

[73] Assignee: Penn Engineering & Manufacturing Corp., Danboro, Pa.

[21] Appl. No.: 100,962

[22] Filed: Sep. 25, 1987

[51] Int. Cl.[4] .............................................. H02K 29/08
[52] U.S. Cl. ..................................................... 318/254
[58] Field of Search ........................ 318/138, 254, 439

[56] References Cited

U.S. PATENT DOCUMENTS

| | | | |
|---|---|---|---|
| 4,283,664 | 8/1981 | Ebert | 318/254 A X |
| 4,353,016 | 10/1982 | Born | 318/254 |
| 4,355,255 | 10/1982 | Herr et al. | 318/138 X |
| 4,494,053 | 1/1985 | Gotou | 318/254 |

FOREIGN PATENT DOCUMENTS 2102222 1/1983 United Kingdom ................ 318/254

Primary Examiner—Bentsu Ro
Attorney, Agent, or Firm—Gregory J. Gore

[57] ABSTRACT

A 12-step commutation in a brushless DC motor is achieved by six shaft-mounted commutation sensors and circuitry which permits inexpensive shaft-angle decoding for coil excitation. The commutation signal devices are Hall sensors arranged in two sets. A first set is arranged to produce the desired switching signals every 120 electrical degrees; a second set of three Hall sensors is similarly arranged equally spaced between the electrical switch points of the first set, however, the second set of sensors is wired together through the process of EXCLUSIVE-ORing to form a single, fourth output. Thus, the six Hall sensors are configured to produce four output signals which may be inexpensively decoded using a standard 32×8 PROM. A further refinement includes current modulation to the field coils in order to equalize the torque output of alternate steps. In one embodiment, this is accomplished by reducing the gain of the motor's servo amplifier so that the desired current shift is achieved by changes in the motor's load impedance.

10 Claims, 6 Drawing Sheets

12-STEP COMMUTATION DEVICE FOR AN ELECTRIC MOTOR

FIELD OF THE INVENTION

This device relates to brushless DC motors and, in particular, a method of commutation whereby motor shaft angle produces a control signal for permitting digital drive of the motor.

BACKGROUND OF THE INVENTION

Commutation signal generators in brushless DC motors commonly employ Hall effect sensors which furnish signals depending upon shaft angle. One or more rotor magnets trigger the Hall sensors which when connected with appropriate circuitry provide the control signals for the switching element of the commutating device. The Hall effect generators are fast, dependable and extremely inexpensive. U.S. Pat. No. 4,283,664 to Ebert, which is hereby incorporated by reference, discloses circuitry which permits two Hall effect sensors displaced 90 degrees apart, electrically, to produce switching signals every 90 degrees electrical.

Furthermore, it is also known to employ stator coil wiring which permits a three-phase stepper motor to achieve 12 torque producing steps within each 360 electrical degrees. U.S. Pat. No. 3,621,358 to Hinrichs et al, which is hereby incorporated by reference, discloses such a wiring circuit which is driven by a clock-pulse generator connected to a shift register and logic gates producing a stepper motor with 12 steps per every 360 electrical degrees.

Problems with the existing art in brushless DC motors include an inherent torque reduction at the time of commutation, friction and magnetic cogging which acting together are referred to as "torque ripple". Most commonly, a three-phase brushless DC motor utilizes only 6 commutation points per 360 electrical degrees and is driven by 3 signaling devices, such as Hall sensors.

One solution to the problem of torque ripple has been the use of sinusoidal current drive systems. However, these are extremely expensive and require a high accuracy shaft angle detector physically built into the motor structure followed by a large amount of accompanying electronic circuitry. It has been found that similar performance can be achieved by the 12-step commutation device disclosed herein at a fraction of the cost.

SUMMARY OF THE INVENTION

The present device demonstrates a new and improved commutation system which economically overcomes the torque ripple problem described above. The present invention seeks to combine known 12-step wiring and coil excitation with a reliable and inexpensive method of commutation switching. As further described herein, a structural layout and related circuitry permits the use of inexpensive electronics and programming in order to decode the signals of 6 Hall effect sensors to produce suitable commutation for a 12-step coil excitation system in a three-phase brushless motor. The advantage of this commutation system is that increasing the number of torque vectors during the commutation cycle reduces the amount of torque variation from the peak torque value which occurs when the two magnetic fields are in quadrature. In a 6-step commutation system, the torque variation drops to a minimum value of 0.866 peak torque. In a 12-step commutation system, the torque variation only drops to 0.966 times peak torque.

The 12-step commutation is achieved by adding a second set of three Hall sensors to the first set of three Hall sensors presently employed in the known 6-step format. In the present device, each of the outputs of the second set of three additional Hall sensors is combined to form a single, fourth output which is shifted 30 degrees electrically from the outputs of the existing three Hall sensors. Using this system, these 4 outputs produce the required switching every 30 electrical degrees and may be inexpensively decoded.

Further described is a method for current modulation which permits the 6 additional steps to produce a torque equal to the torque of the 6 original steps thereby reducing torque ripple and increasing motor efficiency. The 6 current modulated steps added to create a 12-step motor output has reduced torque ripple from a theoretical 13.5% to approximately 3%. Furthermore, average motor torque constant has increased by approximately 10%.

Analog circuitry is also disclosed which provides this current modulation during the additional steps as an alternate embodiment. As further disclosed, this circuitry utilizes changes in the total load impedance of the motor to produce the required current shift.

It is therefore an object of the present invention to reduce torque ripple and increase motor efficiency in a DC brushless motor in a 6-step, three-phase brushless DC motor by adding 6 additional commutation steps occurring between each of the original 6 steps using additional Hall effect sensors and current modulation. It is a further object to achieve current modulation by utilizing changes in the total load impedance of the motor. These and other objects of the present invention will become clear from the following drawings and description of the preferred embodiment.

DESCRIPTION OF THE PREFERRED EMBODIMENT

Figure 1:
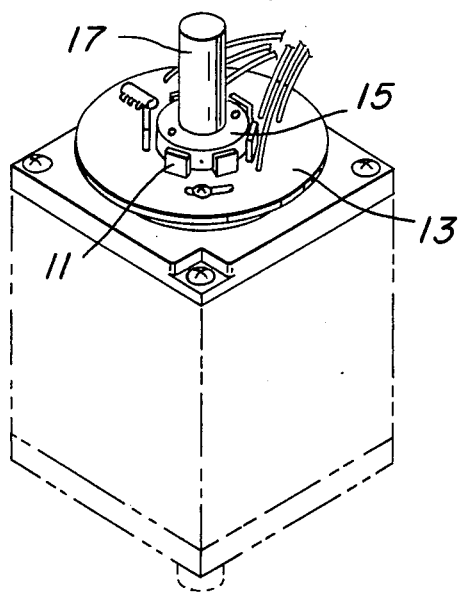
FIG. 1 is a top front isometric view showing the Hall sensor signaling devices mounted on the motor.
Figure 2:
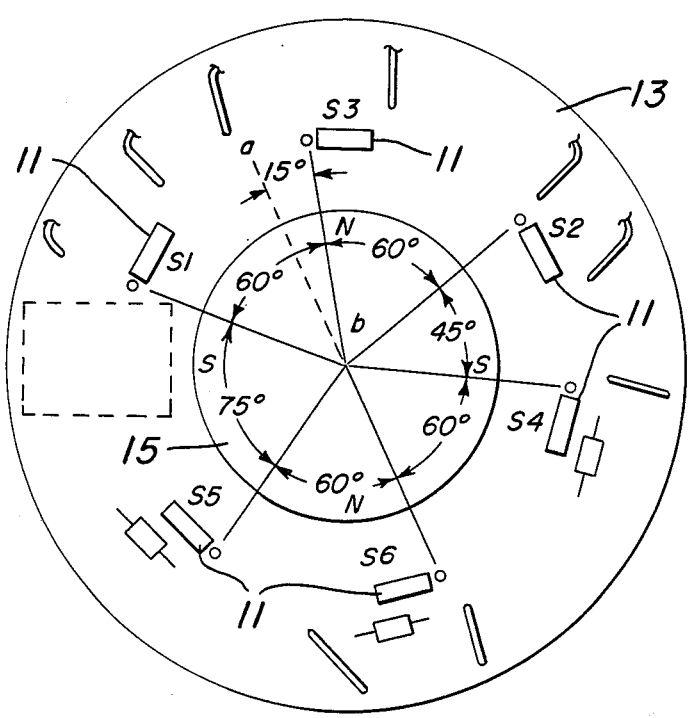
FIG. 2 is a top view of the signal generating Hall sensor detector assembly.

Referring to FIGS. 1 and 2, the preferred embodiment includes a Hall sensor detector assembly consisting of two sets of 3 Hall sensors 11 mounted on one printed circuit board in the form of a stator ring 13 and excited by one magnet 15 mounted on motor shaft 17.

The advantage of this configuration is that only one sensor magnet is required and adjustment for commutation is simplified. In each set, the Hall detectors are displaced by 60 mechanical degrees. This is equivalent to 120 electrical degrees because the exciting magnet has 4 poles. The second set of 3 sensors is also arranged the same mechanically, but is displaced from the first set by 15 mechanical degrees or 30 degrees electrical.

FIGS. 1 and 2 demonstrates a typical assembly in a motor with a 4-pole rotor. In FIG. 2, sensors S1, S2, and S3 comprise the first set, and sensors S4, S5, and S6 comprise the second set. It can be readily understood that if a first set center reference line is chosen through sensor S3, then sensor S1 is at 300 degrees or minus 60 degrees; S2 is at 60 degrees; S4 is at 105 degrees; S5 is at 165 degrees; and S6 is at 225 degrees. Thus, both sets of detectors will develop the identical code of signals, but the signals from the second set will be displaced from the first set by 15 mechanical degrees, or 30 electrical degrees. This is shown by reference line a-b which is drawn through the center of the second set and compared with the centerline of the first set.

Figure 7:
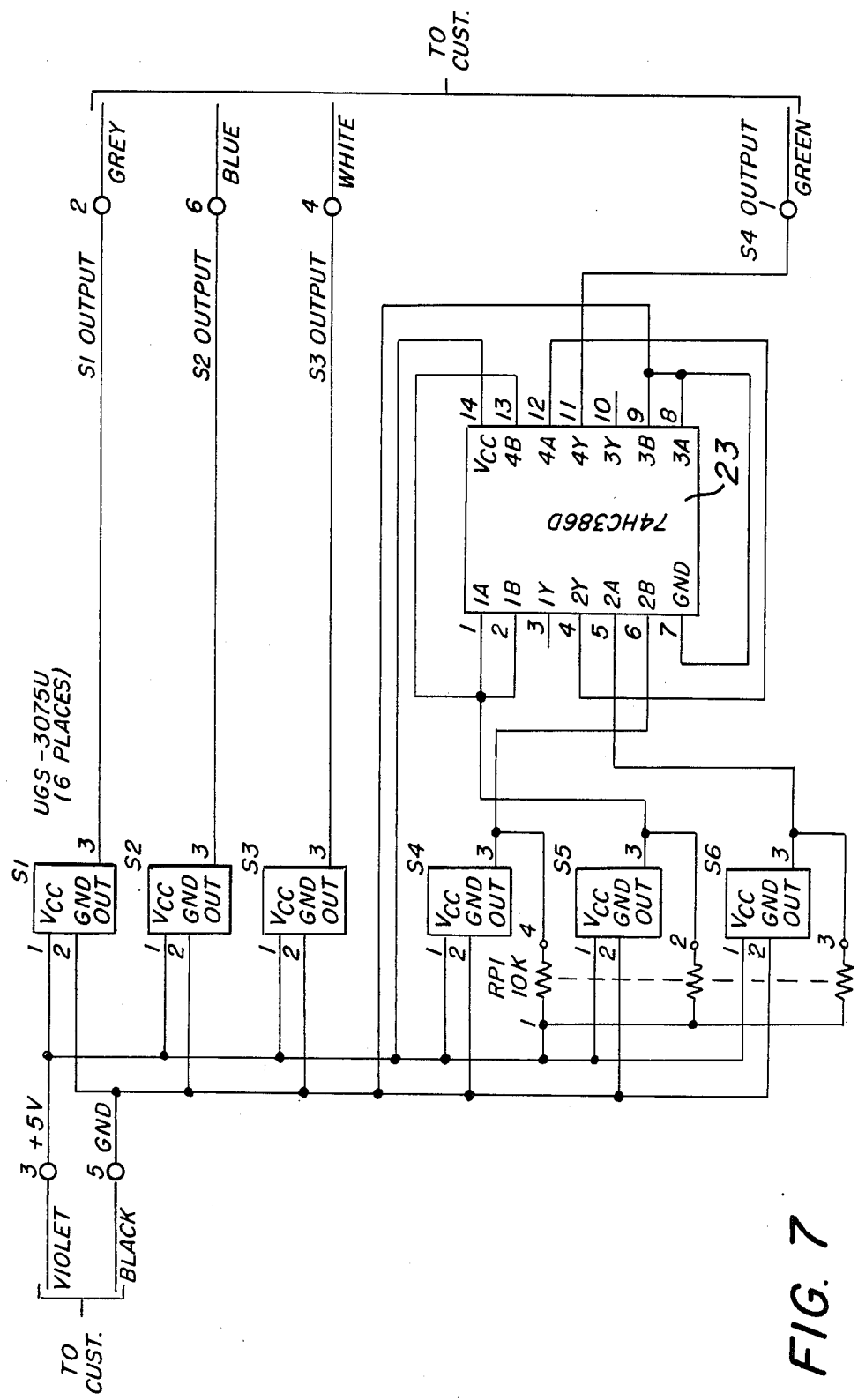
FIG. 7 is a diagramatic circuit showing the Hall sensor wiring.
Figure 9:
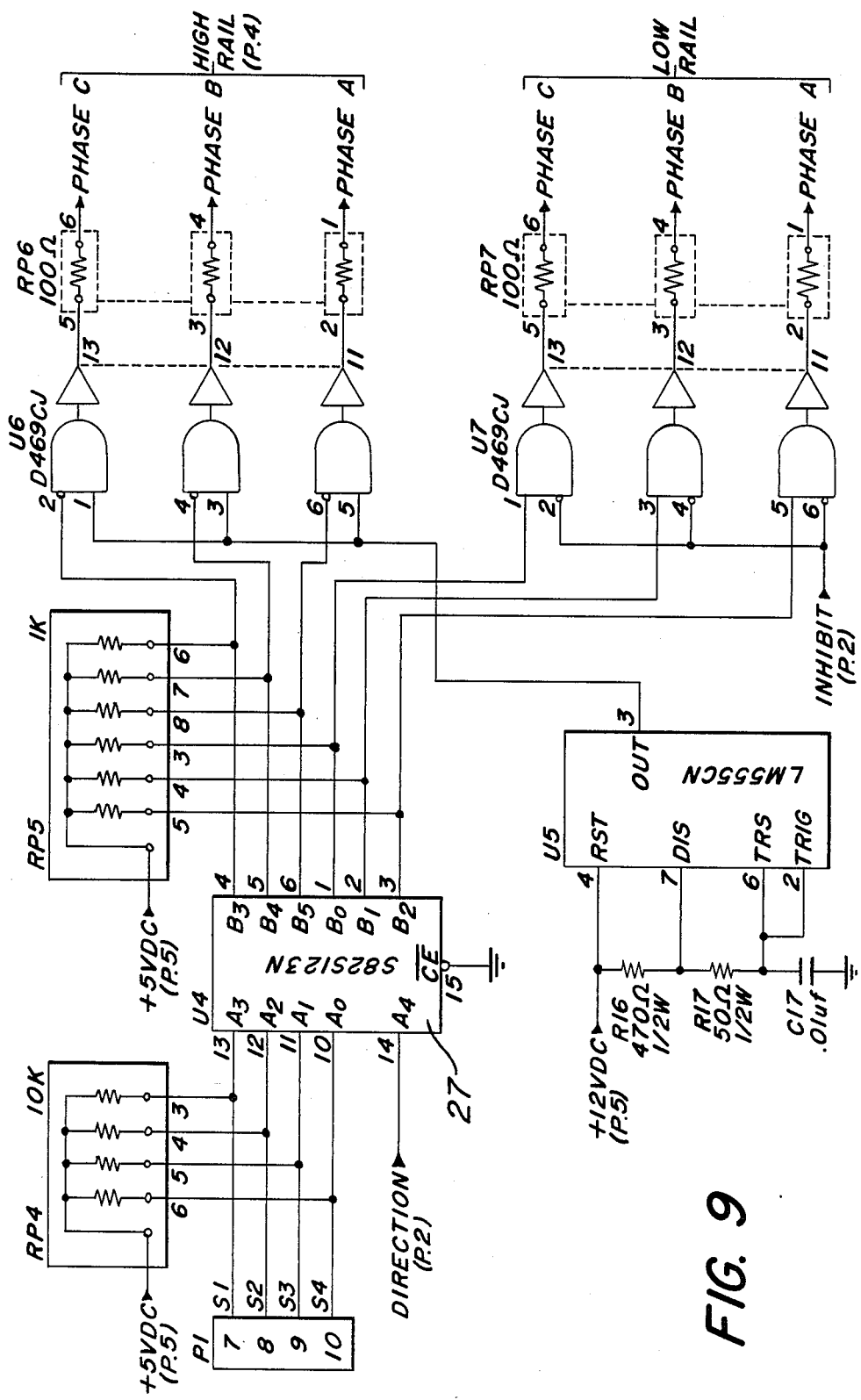
FIG. 9 is a circuit diagram showing the decoding logic circuitry connected to each of the four outputs of the commutation circuit.

The resultant signals S4, S5, and S6 of the second set are reduced to one effective signal by the process of EXCLUSIVE ORing. The relevant circuitry is shown in FIG. 7. Thus, the standard 32×8 PROM 27 as shown in FIG. 9 can be programmed to accomplish the necessary logic decoding. The PROM may be programmed with the outputs active high or active low. In the preferred embodiment, the EXCLUSIVE-OR gate 23 (FIG. 7) is mounted on the Hall sensor board which is, in turn, mounted on the motor. This saves two wires in the signal cable, but it is not necessary to mount the logic device on the motor.

Figure 3:
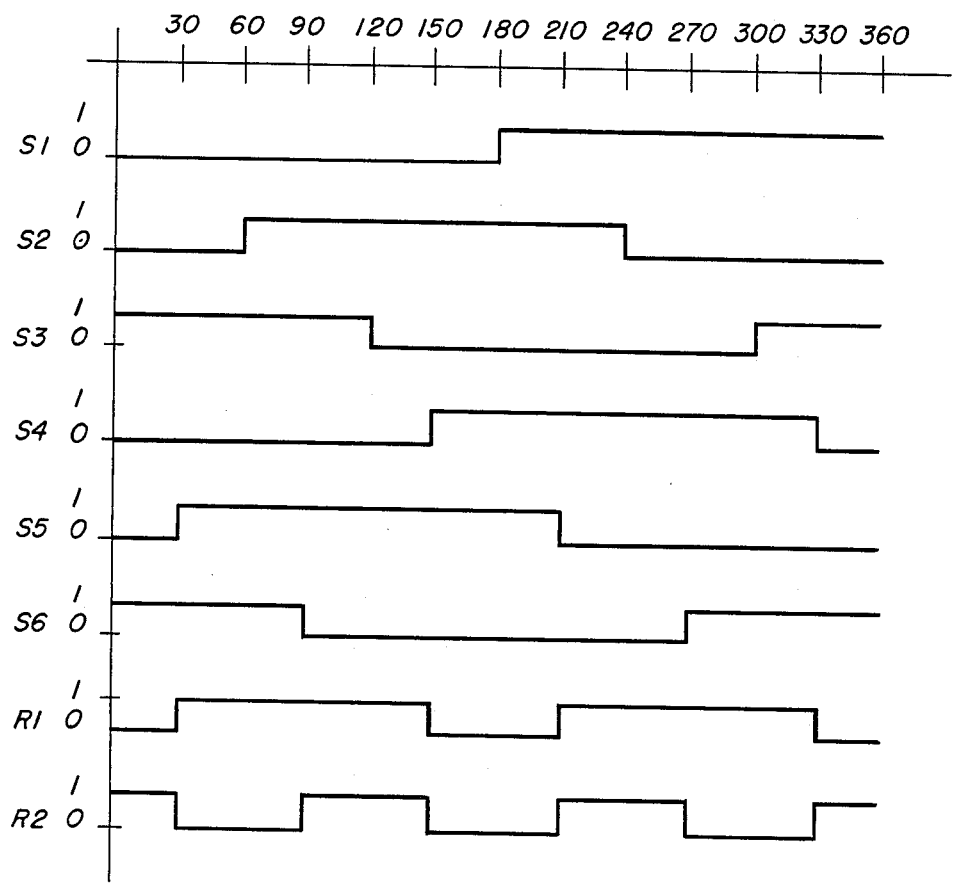
FIG. 3 is a chart showing the output signals of the various Hall sensors.

FIG. 3 shows the output signals of each of the 6 Hall sensing devices and how they can be used to yield a resultant signal which shifts every 30 electrical degrees. The output signals from Hall sensors S4, S5, and S6 are mixed by the process of EXCLUSIVE-ORing to yield the desired resultant signal R2 which provides switching every 60 electrical degrees. Output R1 is the EX-CLUSIVE-OR of signals S4 and S5, and R2 is the EX-CLUSIVE-OR output of S6 and R1. It will be understood that the main advantage has been the production of 30-degree commutation using only 4 input decoding logic. This makes the use of the very inexpensive 32×8 PROM possible. It will also be readily understood that because the signals of the second set of Hall sensors are combined, these additional commutation points cannot be used to determine shaft angle position or shaft rotation direction.

Referring now to FIG. 9, a standard 32×8 PROM 27 is of the type available from Synetics Corporation as Part No. S825123N and as shown in this figure receives each of the four outputs S1, S2, S3, and S4 from the commutation circuitry as shown in FIG. 7. Referring again to FIG. 7, OR gate 23 is of the type available from Motorola, sold as Part. No. 74HC386D.

Figure 4:
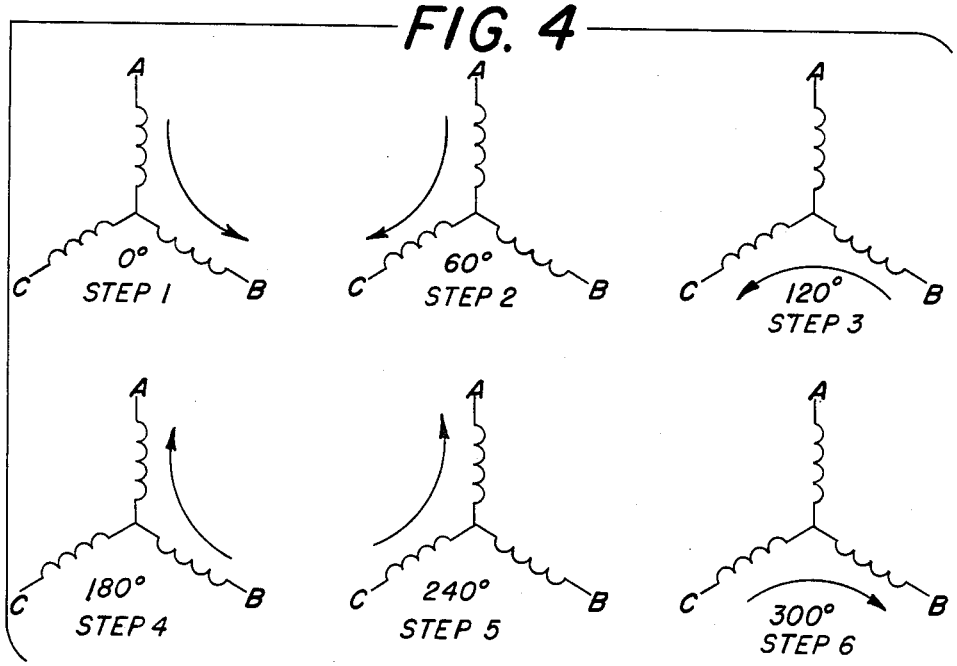
FIG. 4 is a chart showing the current paths of a 6-step, 3-phase coil wiring.
Figure 5:
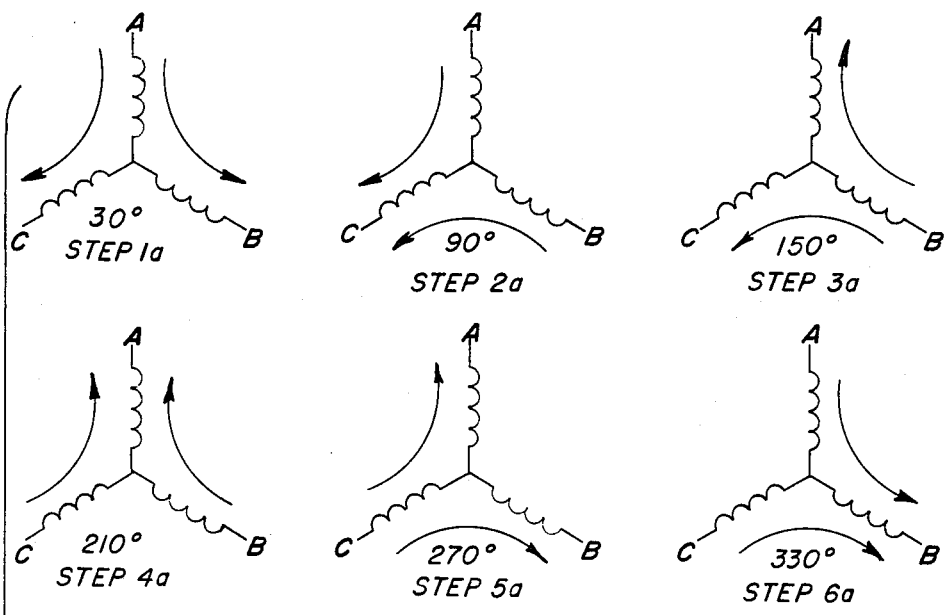
FIG. 5 is a chart showing the 6 additional current paths employed by the present device in order to generate 6 additional commutation steps.

A further refinement has been incorporated to vary the field current during the two different torque cycles to offset the inherent variations which are developed when energizing the coils. Referring now to FIG. 4, current paths are shown for commutation points in normal 6-step design. FIG. 5 shows current paths for the 6 additional commutation points. In the motor in the preferred embodiment in FIG. 4, step 1 shows current flowing through coil A and coil B. In this mode, the two fields are 60 degrees with respect to each other.

The resultant field is an angle halfway between the two fields and with a magnitude equal to 2 times cosine 30 degrees or 2×0.866, which is 1.73 times the coil current. Referring to FIG. 5, step 1a has current through all three coils, but the current flowing through A splits in two paths through coils B and C. Therefore, the current coil B is one-half that of coil A. The torque vector developed by the fields in coils B and C is in phase with the torque vector in coil A. However, the value of the resultant torque vector is equal to 2×0.5 cosine 60 degrees or 0.5. The sum of the two vectors is 1.5. Thus, it can be seen that if the current is constant during the two steps, the torque value is lower by ratio of 1.5 divided by 1.732 or 0.866 during step 1a. To offset this condition, the current is amplified by the factor of 1.155 during step 1a. This may be accomplished by developing a seventh signal out of the PROM during the extra commutation steps.

Figure 6:
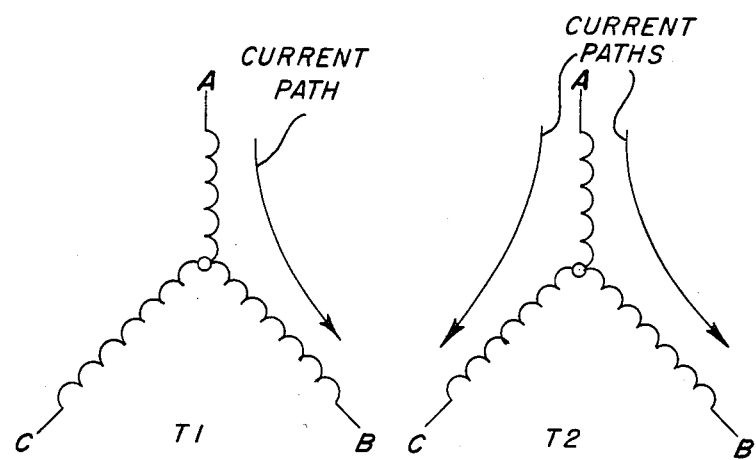
FIG. 6 is a chart showing the current paths through the field coils during alternate commutation steps.

The desired current modulation can also be accomplished by using the change in total load impedance of the motor. Referring now to FIG. 6, current paths T1 and T2 are shown to demonstrate this improved version of current modulation. In its normal circuit configuration, the servo amplifier is in a constant current mode and, as explained above, due to the difference in the torque vectors during the two types of coil excitation, it is desirable to have the total coil current modified by the servo amplifier to compensate for the shift in torque levels. Because the total load impedance of the motor changes, when three motor coils are excited as opposed to two coils, the servo amplifier current exhibits a tendency to increase during the 3-coil excitation. Referring to FIG. 6, the effective resistance of the motor during period T1 is 2 times each coil resistance. Effective resistance during period T2 is 1.5 times each coil resistance. It is evident that if the voltage is held constant during both periods, the current in the circuit will be 33% higher during period T2.

It has been observed that the torque values are unequal if the current is held constant. The torque during T1 is 1.732 times the torque produced by a single coil and during the T2 period, the torque is 1.5 times the torque produced by a single coil. If the current were allowed to increase by a factor of 1.33 as with constant voltage, the torque during T2 would be 2 times the torque produced by a single coil. Therefore, if the servo amplifier is operated in a constant current mode, the torque produced during T2 is 1.5 divided by 1.732, or 0.866 times T1. Furthermore, if the circuit is operated in a constant voltage mode, the torque produced during T2 is 2 divided by 1.732, or 1.155 times T1. As explained above, operation of the amplifier in constant current mode develops greater torque duing period T1; however, operation of the amplifier in constant voltage mode develops greater torque during period T2.

Figure 8:
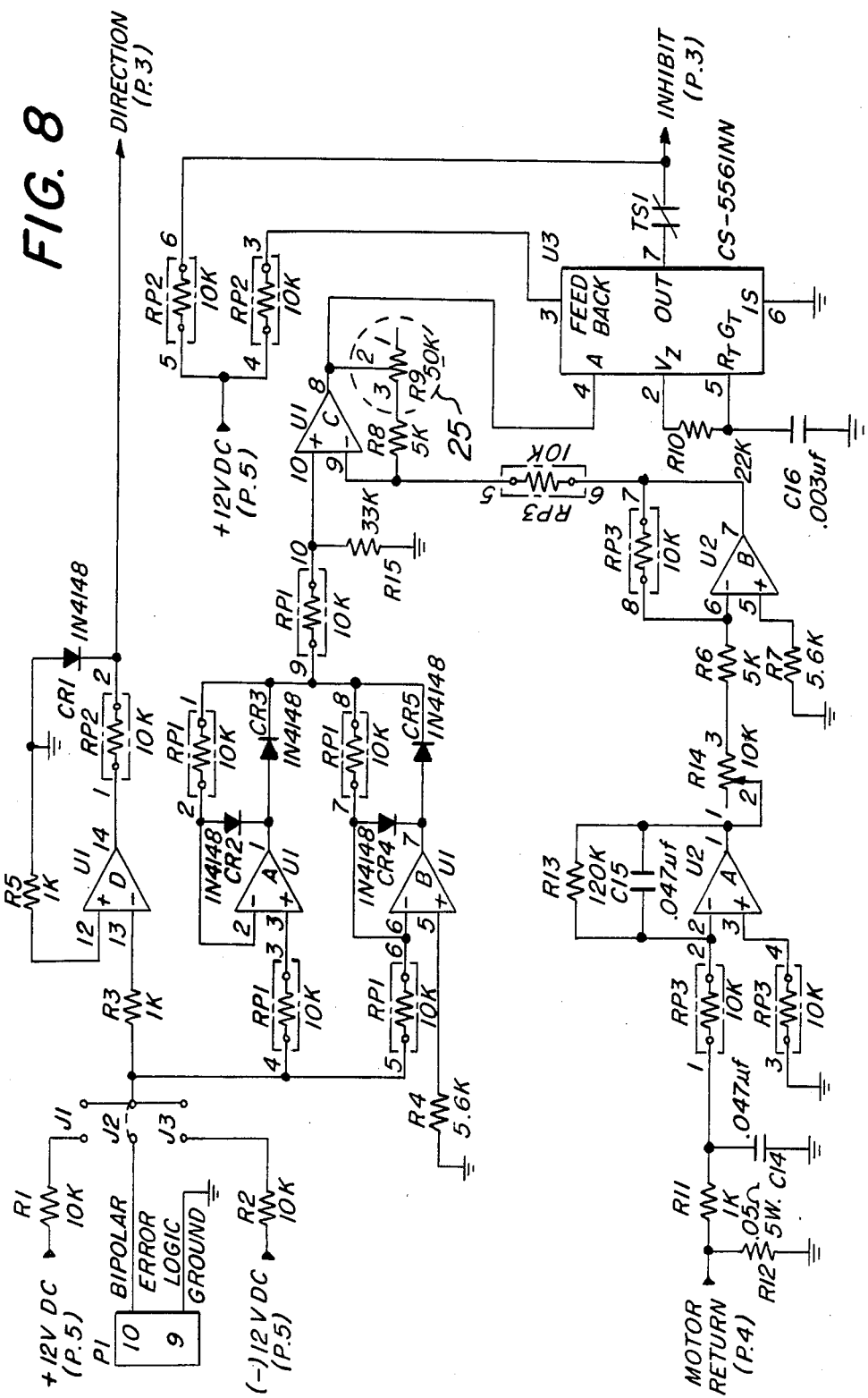
FIG. 8 is a partial circuit diagram of the motor's servo amplifier showing the current feedback portion.

It has been discovered that if the servo amplifier is operated in a constant current mode with a reduced gain, the amount of feedback of the current error can be adjusted to make the torque produced during T2 equal to the torque produced during T1. Typically, servo amplifiers for coil excitation have a gain of approximately 100:1. Usually a high gain amplifier is employed in order to stabilize the current by masking any changes in the motor impedance or the supply voltage. In the present device, the desired result is exactly the opposite; that is, there is desired current variation or a specific amount of current error. To achieve this, a servo amplifier having a gain of approximately 2.0:1 provides the right amount of current shift between commutation steps. In order to fine tune each individual motor, a variable resistor 25 as shown in FIG. 8 may be used in the current feedback portion of the amplifier circuitry in order to adjust the gain and, hence, the correct amount of current shift. In this way, simple analog circuitry can be used to modulate the current in a 12-step drive system without the necessity for developing a seventh signal out of the PROM during the additional commutation steps.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. An electric motor comprises field coils, a rotor having a plurality of permanent magnets, and further comprising:
   a first set and a second set of signal-generating devices mounted on a stator ring for commutating said motor,
   a shaft-mounted commutation magnet for triggering said signal-generating devices,
   said first set of signal-generating devices being spaced equally within 360 electrical degrees,
   said second set of signal-generating devices being spaced equally within 360 electrical degrees, said second set of signal-generating devices is positioned with respect to said first set at one-half of the angle of electrical degrees between two adjacent signal-generating devices of said first set, said second set of signal-generating devices having outputs all electrically combined to form a single commutation output signal.

2. The motor of claim 1 wherein the number of signal-generating devices in the first set is equivalent to the number of signal-generating devices in the second set.

3. The motor of claim 2 further including a decoding circuit connected to both sets of signal-generating devices, said decoding circuit having a number of commutation decoding inputs equal to $N+1$, where N equals the number of signal-generating devices in said first set, said signal-generating devices in said first set individually connected to said decoding circuit to form separate inputs thereto and said second set delivering said combined commutation output signal to said decoding circuit to provide one additional input for decoding.

4. The motor of claim 3 wherein said signal-generating devices are Hall sensors.

5. The motor of claim 4 wherein $N=3$ and the decording circuit is a $32\times 8$ POM providing a 12-step commutation.

6. The motor of claim 5 wherein said signal-generating devices of said first set are positioned on said stator ring with each device spaced 60 mechanical degrees apart radially, said signal-generating devices of said second set are also positioned 60 mechanical degrees apart radially on said stator ring, and said second set is offset 15 mechanical degrees from said first set.

7. The motor of claim 1 further including a current modulation circuit to equalize the torque of commutation steps produced by said first set and said second set of signal-generating devices, said current modulation circuit including a servo amplifier for energizing the field coils, said servo amplifier having a theoretical constant current output and low gain.

8. The motor of claim 7 wherein said servo amplifier has a gain of 10:1 or less.

9. The motor of claim 8 further including a variable resistor for adjusting the servo amplifier gain to achieve a predetermined degree of current shift between commutation steps.

10. The motor of claim 9 wherein said servo amplifier has a gain of approximately 2.0:1.

* * * * *